(12) United States Patent
Maruyama et al.

(10) Patent No.: US 8,164,008 B2
(45) Date of Patent: Apr. 24, 2012

(54) ELECTRICAL APPARATUS

(75) Inventors: Haruhisa Maruyama, Nagano (JP); Tomoaki Ikeda, Nagano (JP); Takahisa Toda, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 234 days.

(21) Appl. No.: 12/710,725

(22) Filed: Feb. 23, 2010

(65) Prior Publication Data

US 2010/0212955 A1  Aug. 26, 2010

(30) Foreign Application Priority Data

Feb. 24, 2009  (JP) .................................. 2009-041152
Feb. 4, 2010  (JP) .................................. 2010-023506

(51) Int. Cl.
*H02G 3/18* (2006.01)
(52) U.S. Cl. ........ 174/657; 174/656; 174/659; 174/562; 439/63
(58) Field of Classification Search .............. 174/656, 174/657, 659, 562; 439/63
See application file for complete search history.

(56) References Cited

U.S. PATENT DOCUMENTS

| 5,553,787 A | * | 9/1996 | Guginsky ...................... 439/472 |
| 5,867,355 A | * | 2/1999 | Arai et al. ...................... 360/137 |
| 6,310,289 B1 | * | 10/2001 | Kuo .............................. 174/650 |
| 7,329,973 B2 | | 2/2008 | Oohashi et al. |

* cited by examiner

*Primary Examiner* — Dhirubhai R Patel
(74) *Attorney, Agent, or Firm* — Rankin, Hill & Clark LLP

(57) ABSTRACT

A cable is sandwiched between a first inner wall surface of a peripheral-wall-side pressing wall portion and a first inner wall surface of a cap-side pressing wall portion, between a second inner wall surface of the peripheral-wall-side pressing wall portion and a second wall surface of the cap-side pressing wall portion, and between a third inner wall surface of the peripheral-wall-side pressing wall portion and a third inner wall surface of the cap-side pressing wall portion to crank the cable to form a cranked portion of the cable. The peripheral-all-side pressing wall portion and the cap-side pressing wall portion sandwich the cranked portion therebetween. Thus, defective soldering may be prevented between a plurality of lead wires and a core-wire soldered portion to which core wires of the lead wires are soldered and connected.

9 Claims, 9 Drawing Sheets

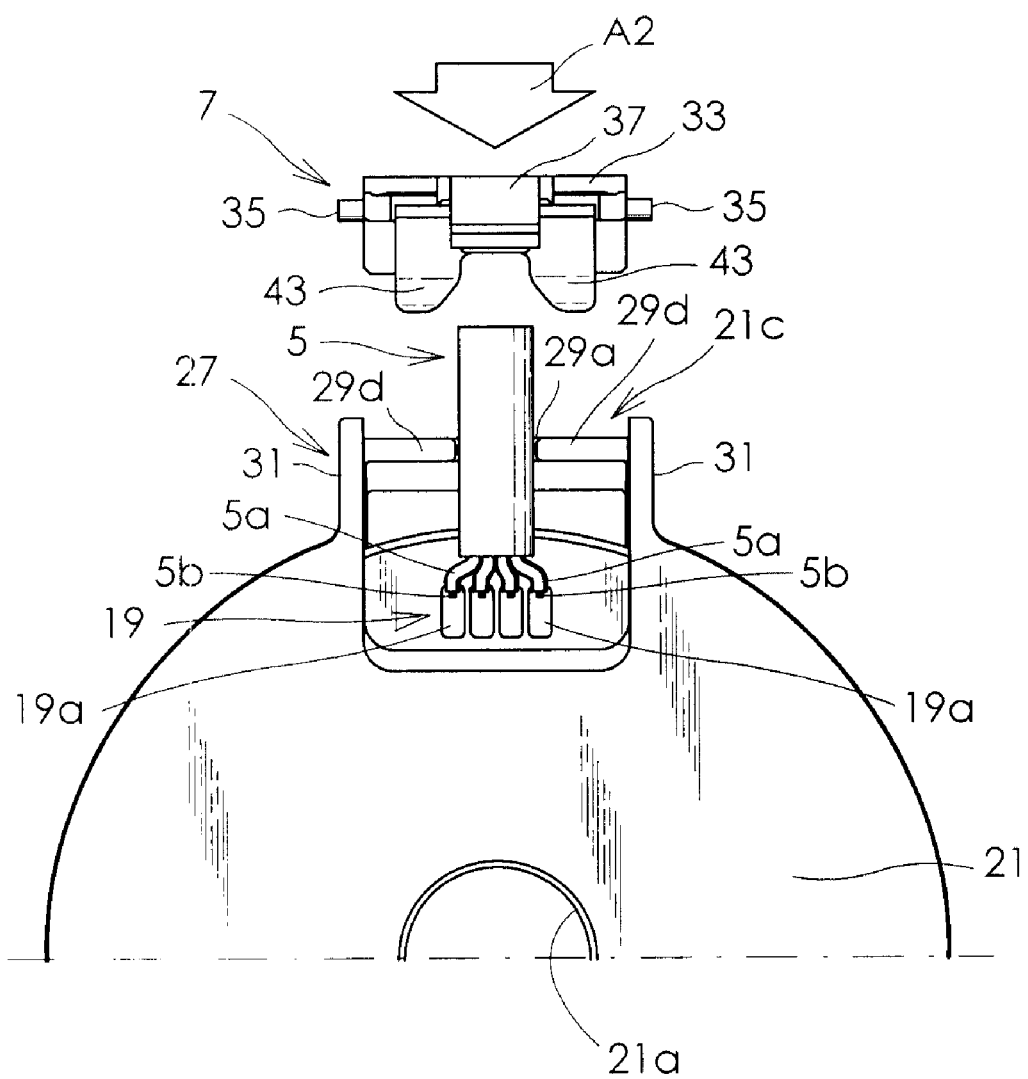

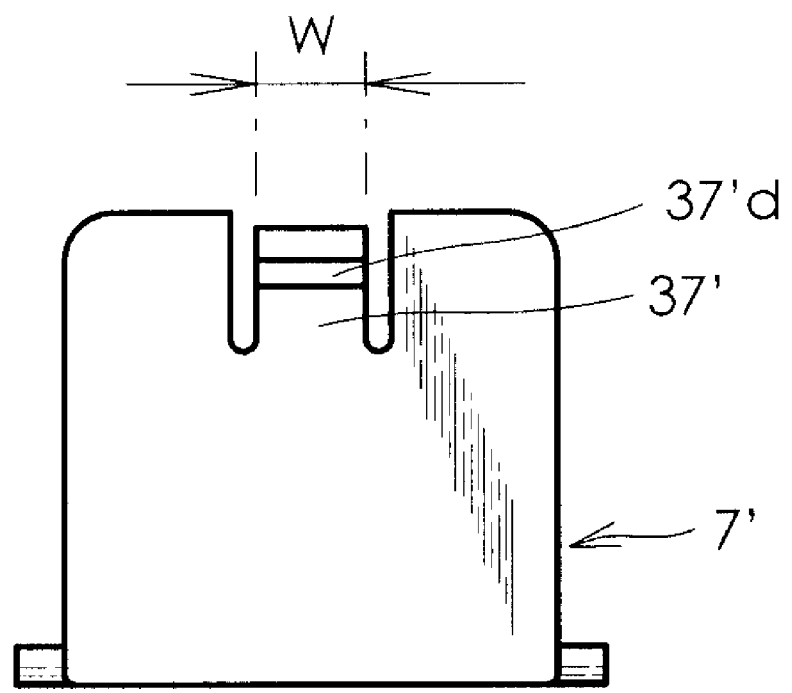

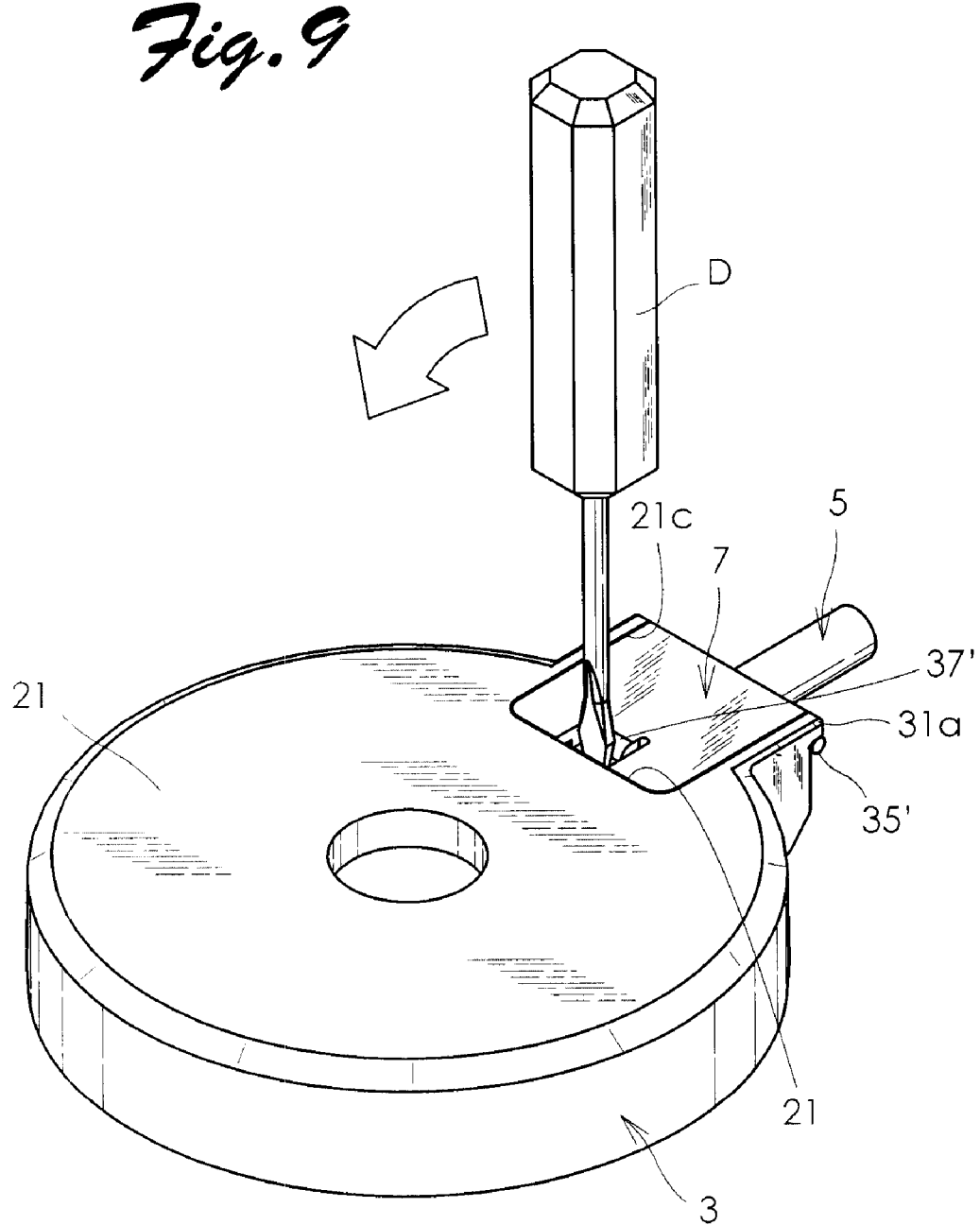

ELECTRICAL APPARATUS

TECHNICAL FIELD

The present invention relates to an electrical apparatus such as a rotary electric machine and a fan motor, which includes a core-wire soldered portion onto which core wires of a plurality of lead wires are soldered and connected.

BACKGROUND ART

Japanese Patent Application Publication No. 2007-53849 (JP2007-53849A), for example, disclose a motor (electrical apparatus), which includes a casing for supporting a motor body and a core-wire soldered portion formed in the motor body. A plurality of lead wires, which are arranged in a bundle to constitute a cable, are soldered and connected to the core-wire soldered portion. The casing of such motor includes an opening portion through which the core-wire soldered portion is accessible so that the plurality of lead wires may be connected to the core-wire soldered portion. The opening portion may be opened and closed by a cap.

SUMMARY OF INVENTION

In conventional electrical apparatus, soldering defects are likely to occur in the core-wire soldered portion of the plurality of lead wires if a force is applied to lead wires even though the opening portion is closed by a cap. An object of the present invention is to provide an electrical apparatus in which soldering defects are less likely to occur in a core-wire soldered portion to which a plurality of lead wires are soldered.

Another object of the present invention is to provide an electrical apparatus in which a cap may firmly be fixed to a casing.

An electrical apparatus according to an embodiment of the present invention comprises a circuit substrate unit, a casing, and a cap member. The circuit substrate unit includes a cable formed of a plurality of lead wires in a bundle and a circuit substrate including a core-wire soldered portion provided with a plurality of electrodes to which core wires of the plurality of lead wires are soldered and connected. The casing includes an opposed wall portion facing one surface of the circuit substrate where the plurality of electrodes are provided, and a peripheral wall portion integrally formed with the opposed wall portion and surrounding an end face of the circuit substrate. The opposed wall portion has a first opening portion so that the core-wire soldered portion is accessible therethrough, and the peripheral wall portion has a second opening portion, formed continuously with the first opening portion, for allowing the cable to extend out therethrough. The cap member fitted in the first and second opening portions to allow the cable to extend out through the second opening portion. The peripheral wall portion and the cap member are shaped so that the cable may be sandwiched between the peripheral wall portion and the cap member when the cap member is fitted in the first and second opening portions. More specifically, the peripheral wall portion and the cap member are shaped so that the cable may be cranked to form a cranked portion and the cranked portion of the cable may be sandwiched between the peripheral wall portion and the cap member when the cap member is fitted in the first and second opening portions.

According to an embodiment of the present invention, the cable is cranked to form a cranked portion and the cranked portion is sandwiched between the peripheral wall portion and the cap member when the cap member is fitted in the first and second opening portions. Thus, the cable is firmly fixed between the peripheral wall portion and the cap member. Since the cranked portion works to prevent the cable from coming off, soldering defects due to a pull-out force applied to the core-wire soldered portion may be effectively prevented even if the pull-out force is applied to the cable.

Preferably, the peripheral wall portion and the cap member may be shaped to form a first pressing structure and a second pressing structure that respectively sandwich and press either ends of the cranked portion in a longitudinal direction of the cranked portion. In such configuration, the first and second pressing structures press the cable at positions different from each other. Accordingly, a force to fix the cable between the peripheral wall portion and the cap member is reinforced, thereby securely preventing the cable from being pulled out of the casing even if a force to pull out the cable from the substrate housing is applied to the cable.

The cap member includes a cap-side pressing wall portion and the peripheral wall portion includes a peripheral-wall-side pressing wall portion. The cap-side pressing wall portion and the peripheral-wall-side pressing wall portion face each other to sandwich and press the cranked portion therebetween. Preferably, at least one of the cap-side pressing wall portion and the peripheral-wall-side pressing wall portion may integrally be formed with a first pair of projecting wall portions and a second pair of projecting wall portions. The first pair of projecting wall portions are disposed adjacent to the first pressing structure and arranged side by side in a direction orthogonal to the longitudinal direction of the cable to sandwich the cable therebetween. The second pair of projecting wall portions are disposed adjacent to the second pressing structure and arranged side by side in the direction orthogonal to the longitudinal direction. In this configuration, the first and second projecting wall portions may sandwich side portions of the cable, which are not in contact with the cap-side pressing wall portion and the peripheral-wall-side pressing wall portion, at the positions of the first and second pressing structures. Thus, undesirable movement of the cable may be suppressed and the cable may be more effectively pressed at the first and second pressing structures.

The cap member includes a plate-like cap body having first to fourth end faces that are continuously and annularly formed in this order, and the first and third end faces are opposed to each other. The cap member also includes a pair of shaft portions projecting from end portions of the first and third end faces in the vicinity the second end face, and a hook member integrally formed with the fourth end face at a central portion thereof. The peripheral wall portion of the casing integrally includes a pair of shaft receiving portions disposed adjacent to the second opening portion to rotatably support the pair of shaft portions. The opposed wall portion of the casing includes at a rim portion surrounding the first opening portion an engaged portion for engaging with the hook member of the cap member. In this configuration, the first and second opening portions may be easily opened and closed with the cap member by rotating the pair of shaft portions. Since the hook member of the cap member is engaged with the engaged portion of the casing when the first and second opening portions are closed with the cap body, the cap member may securely be fixed to the casing.

In one or more embodiments, the peripheral wall portion may include a peripheral wall body and an extended portion integrally formed with the peripheral wall body and extending outwardly from the peripheral wall body. The extended portion includes the peripheral-wall-side pressing wall portion, and a pair of extended walls extending from end portions of the peripheral-wall-side pressing wall portion, which are adjacent to the peripheral wall body, to a position at which the extended walls are continuous with the opposed wall portion. The second opening portion is defined, being surrounded by the peripheral-wall-side pressing wall portion and the pair of extended walls.

The pair of extended walls are each formed integrally with a projecting portion which is located opposite to the peripheral-wall-side pressing wall portion and extending in an outward direction away from the peripheral wall body. Each shaft receiving portion is formed by a first end face portion of the extended wall located in the outward direction and a second end face portion of the projecting portion that is continuous with the first end face portion, and both of the first end face portion and the second end face portion come in contact with outer surfaces of the shaft portions to support the shaft portions. In this configuration, the removable cap member may easily be attached to the casing just by contacting the pair of shaft portions onto the first and second end face portions.

The peripheral-wall-side pressing wall portion includes at an end portion located in the outward direction an extending portion extending along the pair of extended walls. The cap body includes one or more protrusions protruding from the cap body toward the peripheral-wall-side pressing wall portion when the cap member is fitted in the first and second opening portions. The protrusions abut on the peripheral-wall-side pressing wall portion to deform the cap member when an external force toward the second opening portion is applied to the cap body. Thus, the protrusions work as stoppers to prevent the cap member from dropping off from the first and second opening portions. As a result, the pair of shaft portions may be prevented from coming away from the first end face portion. Further, the pair of shaft portions of the cap member may be pressed onto the first and second end face portions by means of an elastic force of the cable generated as the cable is partially sandwiched and pressed between the peripheral-wall-side pressing portion and the cap-side pressing portion. In this manner, the cap member may securely be fixed to the casing by pressing the pair of shaft portions onto the first and second end face portions.

Preferably, the hook member may be configured to be disengaged from the engaged portion if an external force is applied to press cap member inwardly of the casing when the cap member is fitted in the first and second opening portions. The hook member may be shaped and sized so that a slotted screwdriver having a tip of 8 mm or less in width may press down the hook member with the tip of the slotted screwdriver. In this configuration, unintentional disengagement of the hook member from the engaged portion may be effectively prevented unless the hook member is intentionally pressed down with a slotted screwdriver. As a result, reliability and safety may be enhanced.

BRIEF DESCRIPTION OF DRAWINGS

FIG. 7 is a partial plan view illustrating the cap member of the fan motor of FIG. 1 which is not attached to a casing.

FIG. 8 illustrates a modification of the cap member.

FIG. 9 explains how the cap member of FIG. 8 is removed.

DESCRIPTION OF EMBODIMENTS

Figure 1:
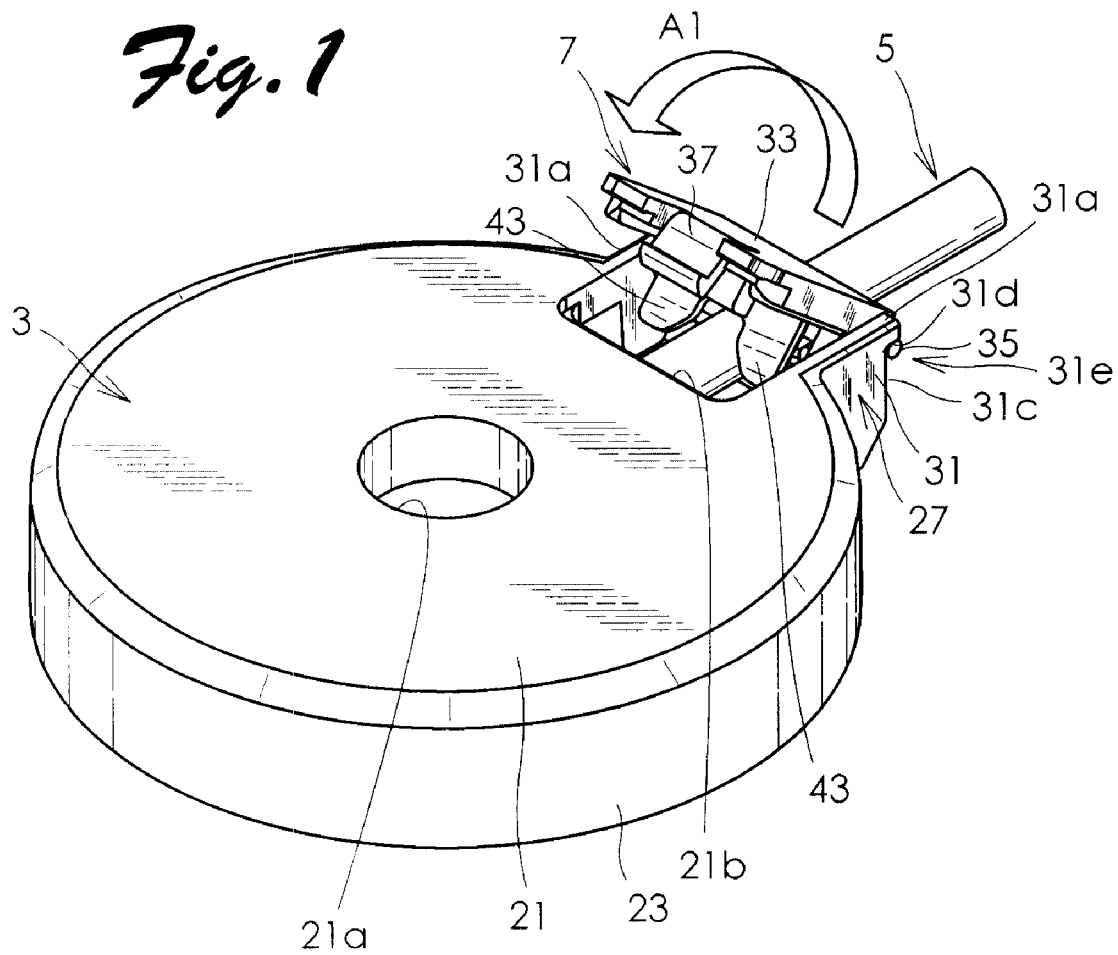
FIG. 1 is a perspective view of an electrical apparatus according to an embodiment of the present invention applied to a fan motor.
Figure 2:
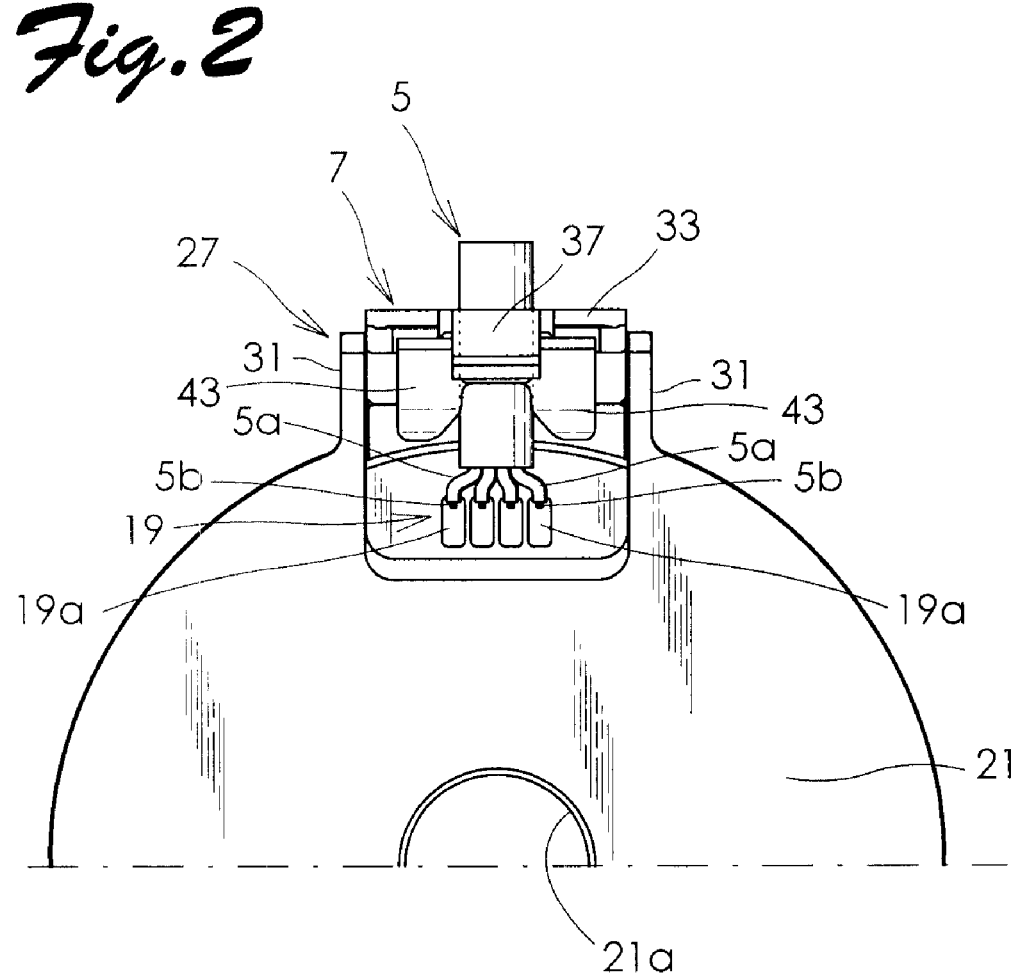
FIG. 2 is a partial plan view of the fan motor of FIG. 1 with its opening portion opened.
Figure 3:
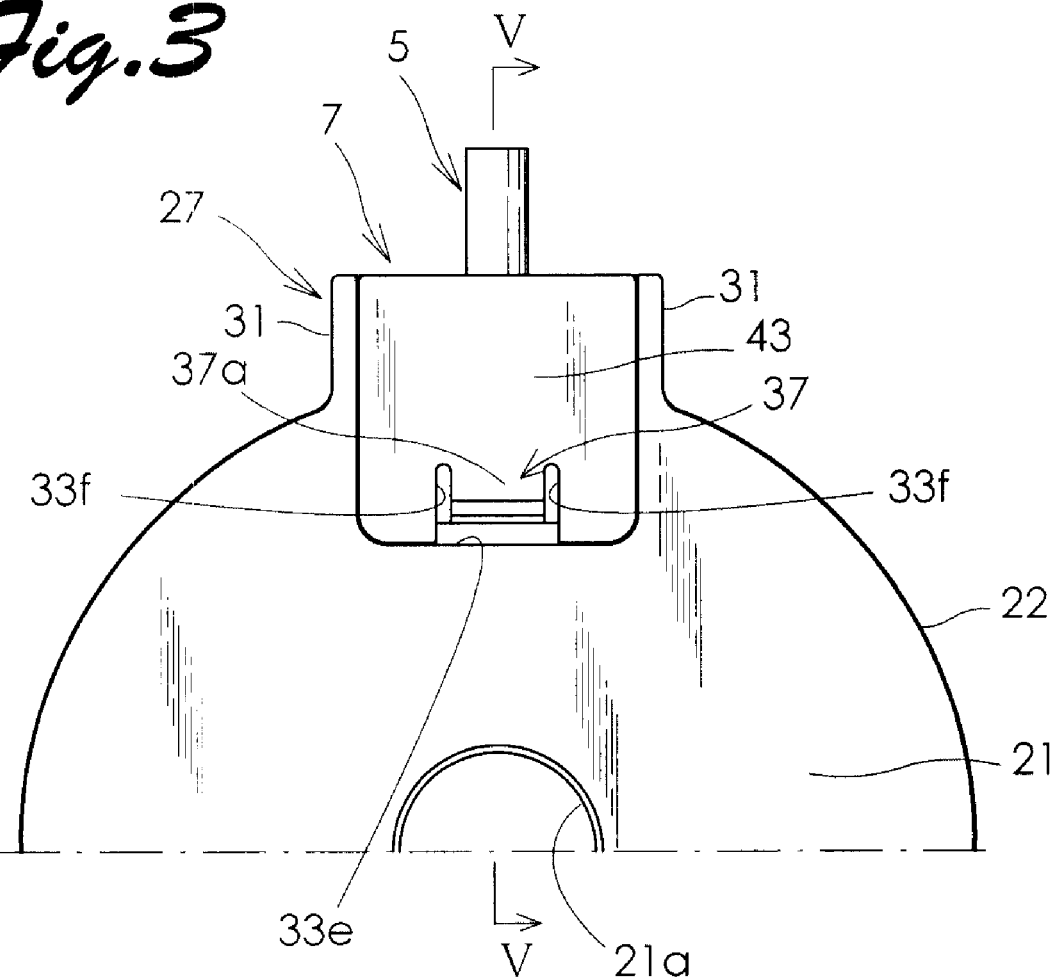
FIG. 3 is a partial plan view of the fan motor of FIG. 1 with its opening portion closed with a cap member.
Figure 4:
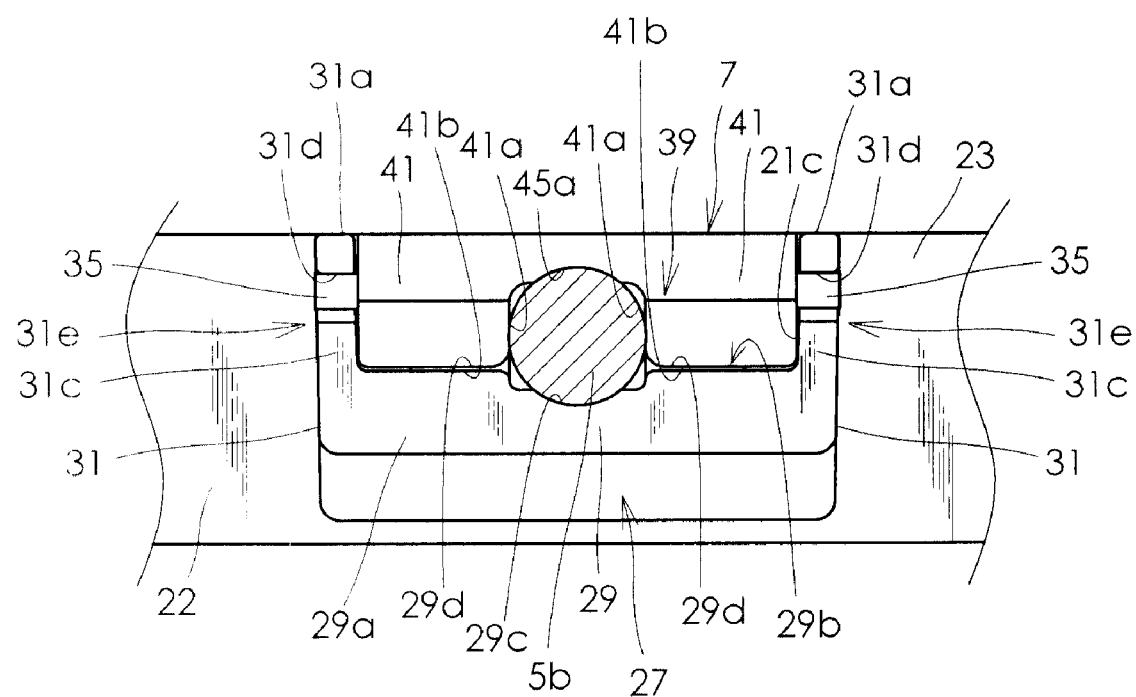
FIG. 4 is a partially enlarged side elevation view of the fan motor of FIG. 1 with its opening portion closed with a cap member.
Figure 5:
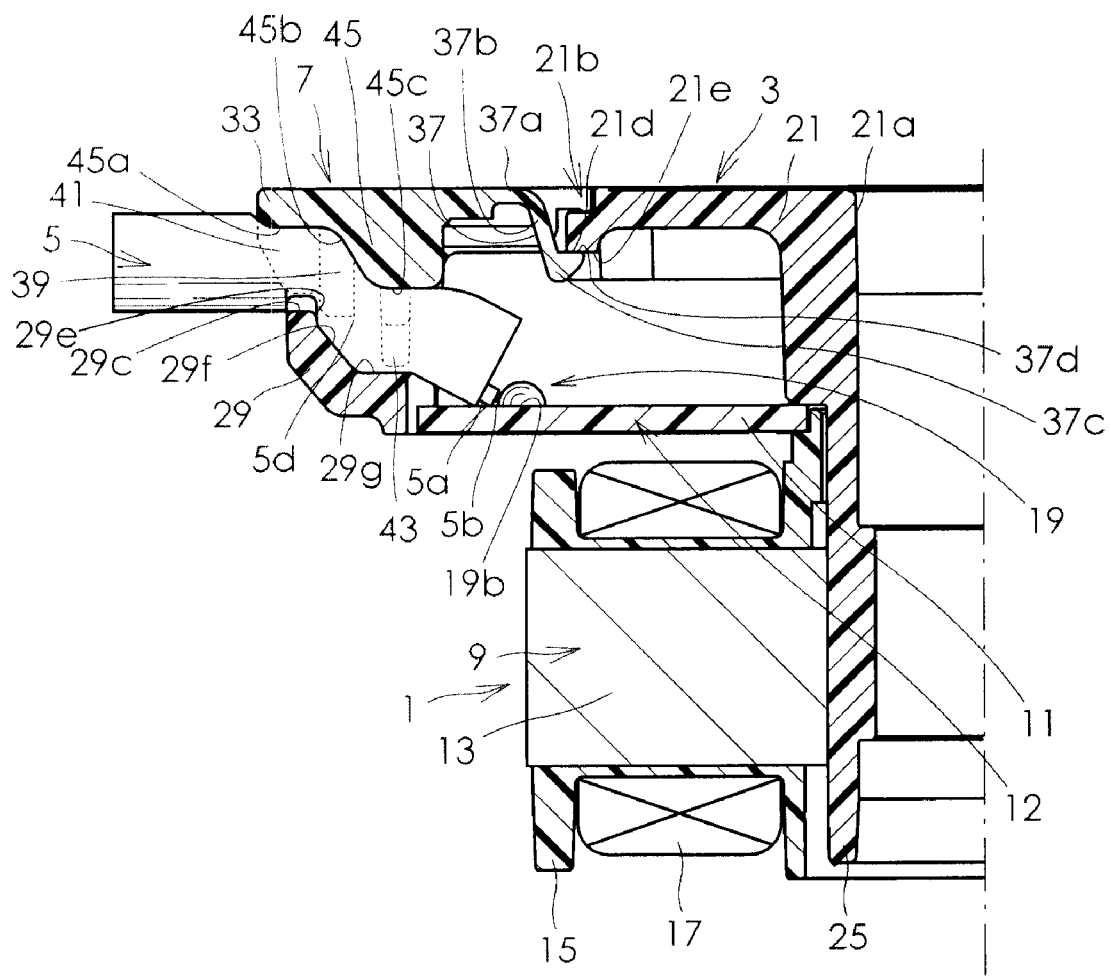
FIG. 5 is a cross sectional view of FIG. 3 taken along line V-V thereof.

Preferred embodiments of the present invention will be described hereinbelow with reference to the drawings. FIG. 1 is a perspective view of an electrical apparatus according to an embodiment of the present invention applied to a fan motor. FIG. 2 is a partial plan view of a motor housing of the fan motor with its first and second opening portions 21b and 21c to be described later opened. FIG. 3 is a partial plan view of the motor housing of the fan motor with its first and second opening portions 21b and 21c closed with a cap member 7. FIG. 4 is a partially enlarged side elevation view of the fan motor with its first and second opening portions 21b and 21c closed with the cap member 7. FIG. 5 is a cross sectional view of FIG. 3 taken along line V-V thereof. As shown in each figure, the fan motor (electrical apparatus) according to the present embodiment includes a motor body 1 (see FIG. 5), a casing 3 that supports or receives the motor body 1, a cable 5 and the cap member 7. As shown in FIG. 5, the motor body 1 includes a stator 9 and a circuit substrate 11, fixed to an after-mentioned bearing holder 25 provided in the casing 3. Though illustration of a rotor and an impeller provided with a fan blade is omitted in FIG. 5, the motor body 1 also includes a rotor and an impeller of the fan that are not illustrated. The stator 9 includes a stator core 13 and winding portions 17 wound around the stator core 13 via an insulator 15. Excitation windings of the winding portions 17 are connected to the circuit substrate 11. A plurality of electronic components that constitute a control circuit for controlling a current passing through the windings are mounted on the circuit substrate 11. The circuit substrate 11 also includes a core-wire soldered portion 19 provided with four electrodes 19a, to which the cable 5 is soldered and connected, on a substrate surface 19b of the circuit substrate 11.

As shown in FIG. 2, the cable 5 is constituted from four lead wires 5a in a bundle. Core wires 5b of the four lead wires 5a are soldered and connected to the four electrodes 19a disposed on the core-wire soldered portion 19 of the circuit substrate 11. According to the present embodiment, the cable 5 and the circuit substrate 11 constitute a circuit substrate unit 12.

The casing 3 is made of aluminum or an insulating resin, and includes an opposed wall portion 21, a peripheral wall portion 23 integrally formed with the opposed wall portion 21 and surrounding an end face of the circuit substrate 11, and a cylindrical bearing holder 25 (FIG. 5) that is integrally formed with the opposed wall portion 21 and extending in parallel with the peripheral wall portion 23. The opposed wall portion 21 is a circular disc in shape having a through-hole 21a formed in the central portion thereof, and facing the substrate surface 19b of the circuit substrate 11 on which the electrodes 19a are disposed and four lead wires 5a are connected to the electrodes 19a. The opposed wall portion 21 has a first opening portion 21b at a rim portion thereof so that expose the core-wire soldered portion 19 of the circuit substrate 11, so that the core-wire soldered portion 19 is accessible therethrough. The first opening portion 21b pierces the opposed wall portion 21 in a thickness direction thereof and opens in an outward direction. In the manufacturing process of the motor, the core wires 5b of the four lead wires 5a are soldered and connected to the electrodes 19a of the core-wire soldered portion 19 through the first opening portion 21b.

The peripheral wall portion 23 includes a peripheral wall body 22 and an extended portion 27 integrally formed with the peripheral wall body 22 and extending outwardly from the peripheral wall body 22. As shown in FIG. 4, the extended portion 27 includes a peripheral-wall-side pressing wall portion 29 and a pair of extended walls 31 extending from both end portions of the peripheral-wall-side pressing wall portion 29, which are adjacent to the peripheral wall body 22, to a position at which the pair of extended walls 31 are continuous with the opposed wall portion 21. The second opening portion 21c is defined, being surrounded by the peripheral-wall-side pressing wall portion 29 and the pair of extended walls 31.

The pair of extended walls 31 are each formed integrally with a projecting portion 31a which is located opposite to the peripheral-wall-side pressing wall portion 29 and extending in an outward direction away from the peripheral wall body 22. A pair of shaft receiving portions 31e are formed by a first end face portion 31c of the extended wall 31 located in the outward direction and a second end face portion 31d of the projecting portion 31a that is continuous with the first end face portion 31c, and both of the first end face portion 31c and the second end face portion 31d are in contact with outer surfaces of the shaft portions 35 to support the shaft portions 35.

As shown in FIG. 5, the peripheral-wall-side pressing wall portion 29 extends in an outward direction away from the peripheral wall body 22 of the casing 3 and is curved toward the cap member 7. As shown in FIG. 4, the peripheral-wall-side pressing wall portion 29 includes an extending portion 29a at an end portion located in the extending direction of the cable 5 (end portion of the peripheral wall body 22 located in a radially outward direction). An end face 29b of the extending portion 29a, which faces the cap member 7, includes a central end face portion including a curved surface 29c curving along the outer surface of the cable 5 and a pair of flat surfaces 29d located on both sides of the central end face portion. The peripheral-wall-side pressing wall portion 29 includes a first inner wall surface 29e extending continuously with the end face 29b in a direction perpendicular to the end face 29b, a second inner wall surface 29f inclined and continuous with the first inner wall surface 29e, and a third inner wall surface 29g extending continuously with the second inner wall surface 29f in a direction parallel with the end face 29b.

As shown in FIG. 4, the second opening portion 21c disposed continuously with the first opening portion 21b is formed between the pair of extended walls 31. Then, the cap member 7 is partially fitted between the pair of extended walls 31, as shown in FIG. 1.

Figure 6:
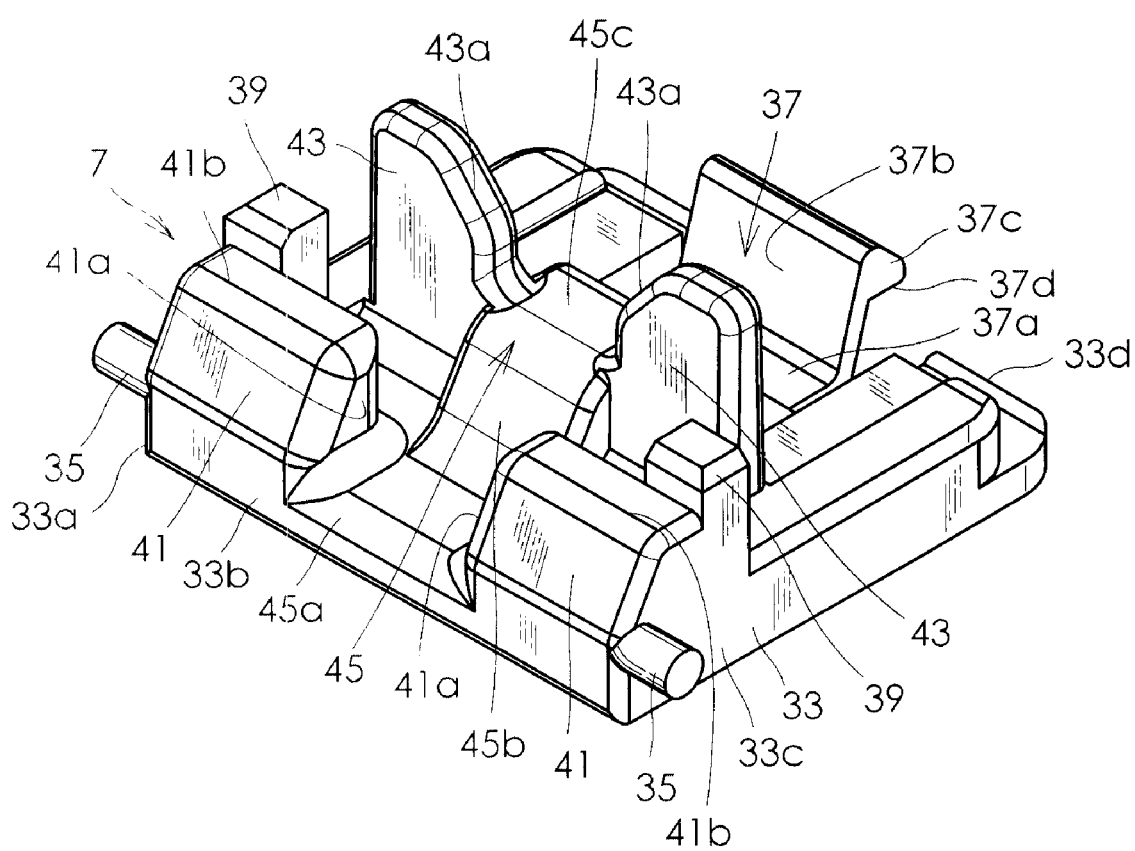
FIG. 6 is a perspective view of the cap member used in the fan motor of FIG. 1.

The cap member 7 is made of an insulating resin, and integrally includes a cap body 33, a pair of shaft portions 35, a hook member 37, a pair of protrusions 39, a first pair of projecting wall portions 41, a second pair of projecting wall portions 43, and a cap-side pressing wall portion 45, as shown in FIG. 6. The cap body 33 has a plate-like rectangular shape having first to fourth end faces 33a to 33d that are continuously and annularly formed in this order so as to open and close the first opening portion 21b and the second opening portion 21c. A pair of shaft portions 35 are a short pillar in shape, and projecting in opposite directions from end portions of the first and third end faces 33a and 33c of the cap body 33 in the vicinity of the second end face 33b.

The hook member 37 includes a base portion 37a integrally formed with the fourth end face 33d of the cap body 33 at a central portion thereof, a projecting portion 37b of the cap member projecting from the cap body 33 toward the core-wire soldered portion 19 when the cap member 7 is fitted in the first and second opening portions 21b and 21c, and an engaging portion 37c formed at the end of the projecting portion 37b. As shown in FIG. 3, when the cap member 7 is fitted in the first and second opening portions 21b and 21c, a gap portion 33e is defined between the base portion 37a and the opposed wall portion 21 of the casing 3. A pair of slits 33f are defined on both sides of the base portion 37a which is continuous with the gap portion 33e. Accordingly, the base portion 37a has a spring mechanism that allows the projecting portion 37b of the cap member 7 and the engaging portion 37c to be inclined with respect to the cap body 33. As shown in FIG. 5, because of the spring mechanism of the base portion 37a, the engaging portion 37c is engaged resiliently with an engaged portion 21d that is formed in the opposed wall portion 21 of the casing 3. The engaged portion 21d is formed at a rim portion of the opposed wall portion 21 surrounding the first opening portion 21b and projecting toward the first opening portion 21b and the core-wire soldered portion 19. The engaged portion 21d has an engaged surface 21e on a portion facing the core-wire soldered portion 19. The engaging portion 37c of the hook member 37 has an engagement surface 37d that abuts on the engaged surface 21e of the engaged portion 21d when the cap member 7 is fitted in the first and second opening portions 21b and 21c.

As shown in FIGS. 5 and 6, the pair of protrusions projects from the cap body 33 toward the peripheral-wall-side pressing wall portion 29 and side surfaces of the protrusions abut on the first inner wall surface 29e of the extending portion 29a of the peripheral-wall-side pressing wall portion 29 when an external force toward the second opening portion 21c is applied to the cap body 33. Thus, the protrusions 39 work as stoppers to prevent the cap member (7) from dropping off from the first and second opening portions 21b, 21c.

As shown in FIGS. 4 and 6, the first pair of projecting wall portions 41 are formed at end portions of the cap body 33, and projecting toward the peripheral-wall-side pressing wall portion 29 when the cap member 7 is fitted in the first and second opening portions 21b and 21c. The first pair of projecting wall portions 41 each include an opposed face 41a contacting an outer surface of the cable 5 and a face 41b continuous with the opposed face 41a and extending in parallel with the cap body 33. The cable 5 extends out from between the first pair of projecting wall portions 41 when the cap member 7 is fitted in the first and second opening portions 21b and 21c.

As shown in FIG. 6, a second pair of projecting wall portions 43 each have a curved surface 43a in a portion facing the peripheral-wall-side pressing wall portion 29, and the curved surface 43a is in contact with an outer circumferential surface of the cable 5.

As shown in FIGS. 5 and 6, the cap-side pressing wall portion 45 faces the peripheral-wall-side pressing wall portion 29 and a part of the circuit substrate 11 when the cap member 7 is fitted in the first and second opening portions 21b and 21c. A portion of the cap-side pressing wall portion 45 that faces the peripheral-wall-side pressing wall portion 29 includes a first inner wall surface 45a that is formed of an arc-shaped curved surface and extending in a direction that the cable 5 is extended out, a second inner wall surface 45b that is extended continuously with the first inner wall surface 45a inclining toward the circuit substrate 11, and a third inner wall surface 45c extending continuously with the second inner wall surface 45b and in parallel with the first inner wall surface 45a. Accordingly, when the cap member 7 is fitted in the first and second opening portions 21b and 21c, the cable 5 is sandwiched between the curved surface 29c that is formed in the extending portion 29a of the peripheral-wall-side pressing wall portion 29 and the first inner wall surface 45a of the cap-side pressing wall portion 45, the second inner wall surface 29f of the peripheral-wall-side pressing wall portion 29 and the second inner wall surface 45b of the cap-side pressing wall portion 45, and the third inner wall surface 29g of the peripheral-wall-side pressing wall portion 29 and the third inner wall surface 45c of the cap-side pressing wall portion 45, thereby being cranked and deformed. As a result, the cable 5 is partially formed into a cranked portion 5d and is sandwiched between the peripheral-wall-side pressing wall portion 29 and the cap-side pressing wall portion 45. In addition, the curved surface 29c of the peripheral-wall-side pressing wall portion 29 and the first inner wall surface 45a of the cap-side pressing wall portion 45 constitute a first pressing structure that presses the cable 5, and the third inner wall surface 29g of the peripheral-wall-side pressing wall portion 29 and the third inner wall surface 45c of the cap-side pressing wall portion 45 constitute a second pressing structure that presses the cable 5. The foregoing first pair of projecting wall portions 41 are disposed adjacent to the first pressing structure (29c and 45a) to sandwich the cable 5, and the second pair of projecting wall portions 43 are disposed adjacent to the second pressing structure (29g and 45c) to sandwich the cable 5.

Subsequently, how to attach the cable 5 and the cap member 7 to a motor will be described hereinbelow. First, as shown in FIG. 7, wire cores 5b of the four lead wires 5a of the cable 5 are soldered and connected to the four electrodes 19a of the core-wire soldered portion 19 provided on the circuit substrate 11, with the cable 5 placed on the curved surface 29c of the peripheral-wall-side pressing wall portion 29. Then, the cap member 7 is brought close to the extended portion 27 (see arrow A2) until the pair of shaft portions 35 of the cap member 7 come into contact with the first end face portions 31c of the pair of extended wall portions 31 and the second end face portions 31d of the pair of projecting portions 31a so that the pair of shaft portions 35 are supported by the pair of shaft receiving portions 31e. At this point, the cap body 33 is pressed upward due to the resiliency or elastic force of the cable 5 so that the pair of shaft portions 35 are each pressed onto the second end face portions 31d of the pair of projecting portions 31a. Subsequently, the cap body 33 is fitted in the first opening portion 21b and the second opening portion 21c by rotating the pair of shaft portions 35 (see arrow A1 of FIG. 1). Thus, the second opening portion 21c through which the cable 5 extends out is closed with the first pair of projecting wall portions 41. When the hook member 37 and the engaged portion 21d of the casing 3 are engaged with each other, the cable 5 is sandwiched and cranked between the peripheral-wall-side pressing wall portion 29 and the cap-side pressing wall portion 45. At this point, the pair of shaft portions 35 are pressed onto the second end face portion 31d of the pair of projecting portions 31a due to the resiliency or elastic force of a portion of the cable 5 that is sandwiched between the curved surface 29c of the peripheral-wall-side pressing wall portion 29 and the first inner wall surface 45a of the cap-side pressing wall portion 45 of the cab body 33 and between the third inner wall surface 29g of the peripheral-wall-side pressing wall portion 29 and the third inner wall surface 45c of the cap-side pressing wall portion 45 of the cap body 33. Further, the pair of shaft portions 35 are pressed onto the first end face 31c of the pair of extended 31 walls 31 due to the resiliency or elastic force of a portion of the cable 5 that is sandwiched between the second inner wall surface 29f of the peripheral-wall-side pressing wall portion 29 and the second inner wall surface 45b of the cap-side pressing wall portion 45 of the cap body 33. As described before, side surfaces of the pair of protrusions 39 abut on the first inner wall surface 29e of the extending portion 29a of the peripheral-wall-side pressing wall portion 29 if an external force toward the second opening portion 21c is applied to the cap body 33. Thus, the protrusions 39 work as stoppers to prevent the cap member 7 from dropping off from the first and second opening portions 21b,21c.

According to the motor of the present embodiment, when the cap member 7 is fitted in the first and second opening portions 21b and 21c, the cable 5 is cranked to form a cranked portion 5d and the cranked portion 5d is sandwiched between the peripheral-wall-side pressing wall portion 29 and the cap-side pressing wall portion 45. Thus, the cable 5 is firmly fixed between the peripheral-wall-side pressing wall portion 29 and the cap-side pressing wall portion 45. As a result, dropout of the four lead wires 5a from the core-wire soldered portion 19 may be prevented even if an external force is applied to the cable 5.

The above-mentioned embodiments relate to a fan motor to which the present invention is applied. The present invention may be applied to ordinary motors having no fan and other electrical apparatus other than motors.

FIG. 8 illustrates a modification of the cap member 7'. FIG. 9 explains how the cap member 7' of FIG. 8 is removed from the casing. The cap member 7' of FIG. 8 includes a hook member 37' that is configured to be disengaged from an engaged portion 21d (not illustrated in FIG. 8) if an external force is applied to press the cap member 7' inwardly of the casing 3 when the cap member 7' is fitted in the first and second opening portions 21d and 21c. The hook member 37' is shaped and sized, especially in the width dimension thereof, so that a slotted screwdriver D having a tip of 8 mm or less in width may press down the hook member 37' with the tip of the slotted screwdriver D. In this configuration, unintentional disengagement of the hook member 37' from the engaged portion may effectively be prevented unless the hook member 37' is intentionally pressed down with the slotted screwdriver D. According to the present embodiment, when the hook member 37' is disengaged from the engaged portion by pressing down the engagement surface 37'd of the hook member 37' and the hook member 37' is pushed out in a direction in which the cable 5 extends out, the pair of shaft portions 35' are disengaged from the shaft receiving portions 31e provided in the pair of projecting portions 31a. Thus, the cap member 7' may be disengaged from the casing 3. With such configuration of the cap member 7', reliability and safety may be enhanced.

According to the present invention, a cable is cranked to form a cranked portion and the cranked portion is sandwiched between a peripheral wall portion and a cap member when the cap member is fitted in the first and second opening portions. As a result, the cable is firmly fixed between the peripheral wall portion and the cap member. Since the cranked portion works as a retaining portion, it may effectively prevent defective soldering which may be caused if a pull-out force is applied to the cable and accordingly to the core-wire soldered portion.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. An electrical apparatus comprising:
   a circuit substrate unit including:

a cable formed of a plurality of lead wires in a bundle; and a circuit substrate including a core-wire soldered portion provided with a plurality of electrodes to which core wires of the plurality of lead wires are soldered and connected;

a casing including:

an opposed wall portion facing one surface of the circuit substrate where the plurality of electrodes are provided, the opposed wall portion having a first opening portion so that the core-wire soldered portion is accessible therethrough, and a peripheral wall portion integrally formed with the opposed wall portion and surrounding an end face of the circuit substrate, the peripheral wall portion having a second opening portion formed continuously with the first opening portion, for allowing the cable to extend out therethrough; and a cap member fitted in the first and second opening portions to allow the cable to extend out through the second opening portion, wherein the peripheral wall portion and the cap member are shaped so that the cable may be sandwiched between the peripheral wall portion and the cap member when the cap member is fitted in the first and second opening portions.

2. The electrical apparatus according to claim 1, wherein the peripheral wall portion and the cap member are shaped so that the cable may be cranked to form a cranked portion and the cranked portion of the cable may be sandwiched between the peripheral wall portion and the cap member when the cap member is fitted in the first and the second opening portions.

3. The electrical apparatus according to claim 2, wherein the peripheral wall portion and the cap member are shaped to form a first pressing structure and a second pressing structure that respectively sandwich and press either ends of the cranked portion in a longitudinal direction of the cranked portion.

4. The electrical apparatus according to claim 3, wherein the cap member includes a cap-side pressing wall portion and the peripheral wall portion includes a peripheral-wall-side pressing wall portion, the cap-side pressing wall portion and the peripheral-wall-side pressing wall portion facing each other to sandwich and press the cranked portion therebetween; and at least one of the cap-side pressing wall portion and the peripheral-wall-side pressing wall portion is integrally formed with a first pair of projecting wall portions and a second pair of projecting wall portions, the first pair of projecting wall portions being disposed adjacent to the first pressing structure and arranged side by side in a direction orthogonal to the longitudinal direction of the cable to sandwich the cable therebetween, and the second pair of projecting wall portions being disposed adjacent to the second pressing structure and arranged side by side in a direction orthogonal to the longitudinal direction to sandwich the cable therebetween.

5. The electrical apparatus according to claim 4, wherein the cap member includes:

a plate-like cap body having first to fourth end faces that are continuously and annularly formed in this order, the first and third end faces being opposed to each other;

a pair of shaft portions projecting respectively from end portions of the first and third end faces in the vicinity of the second end face, and a hook member integrally formed with the fourth end face at a central portion thereof;

the peripheral wall portion of the casing includes a pair of shaft receiving portions disposed adjacent to the second opening portion to rotatably support the pair of shaft portions; and the opposed wall portion of the casing includes at a rim portion surrounding the first opening portion an engaged portion for engaging with the hook member of the cap member.

6. The electrical apparatus according to claim 5, wherein the peripheral wall portion includes a peripheral wall body and an extended portion integrally formed with the peripheral wall body and extending outwardly from the peripheral wall body;

the extended portion includes the peripheral-wall-side pressing wall portion and a pair of extended walls, and the extended walls extend from both end portions of the peripheral-wall-side pressing wall portion, which are adjacent to the peripheral wall body, to a position at which the extended walls are continuous with the opposed wall portion; and the second opening portion is defined, being surrounded by the peripheral-wall-side pressing wall portion and the pair of extended walls.

7. The electrical apparatus according to claim 6, wherein the pair of extended walls are each formed integrally with a projecting portion which is located opposite to the peripheral-wall-side pressing wall portion and extending in an outward direction away from the peripheral wall body; and each shaft receiving portion is formed by a first end face portion of the extended wall located in the outward direction and a second end face portion of the projecting portion that is continuous with the first end face portion, and the first end face portion and the second end face portion contact outer surfaces of the shaft portions to support the shaft portions.

8. The electrical apparatus according to claim 7, wherein the peripheral-wall-side pressing wall portion includes, at an end portion located in the outward direction, an extending portion extending along the pair of extended walls;

the cap body includes one or more protrusions protruding from the cap body toward the peripheral-wall-side pressing wall portion when the cap member is fitted in the first and second opening portions; and side surfaces of the one or more protrusions of the cap body abut on the inner wall surface of the extending portion when an external force toward the second opening portion is applied to the cap body, and the protrusions thus work as stoppers to prevent the cap member from dropping off from the first and second opening portions.

9. The electrical apparatus according to claim 5, wherein the hook member is configured to be disengaged from the engaged portion if an external force is applied to press the cap member inwardly of the casing when the cap member is fitted in the first and second opening portions; and the hook member is shaped and sized so that a slotted screwdriver having a tip of 8 mm or less in width may press down the hook member with the tip of the slotted screwdriver.

* * * * *